Jan. 28, 1936.  M. W. STOUT, JR  2,029,122
GRADING MACHINE
Filed Jan. 12, 1935    2 Sheets-Sheet 2
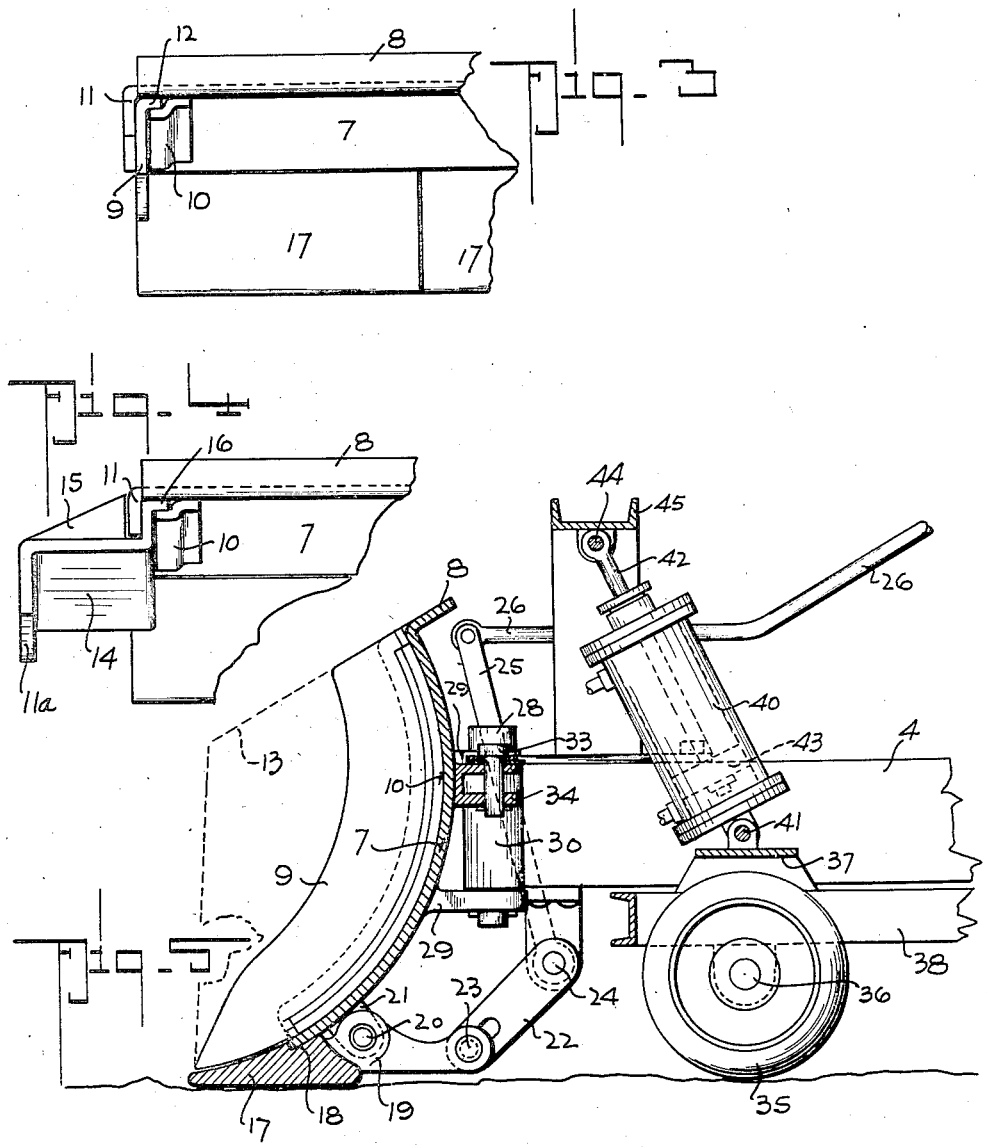
Mark W. Stout, Jr.
Inventor
By Herbert E. Smith
Attorney Patented Jan. 28, 1936

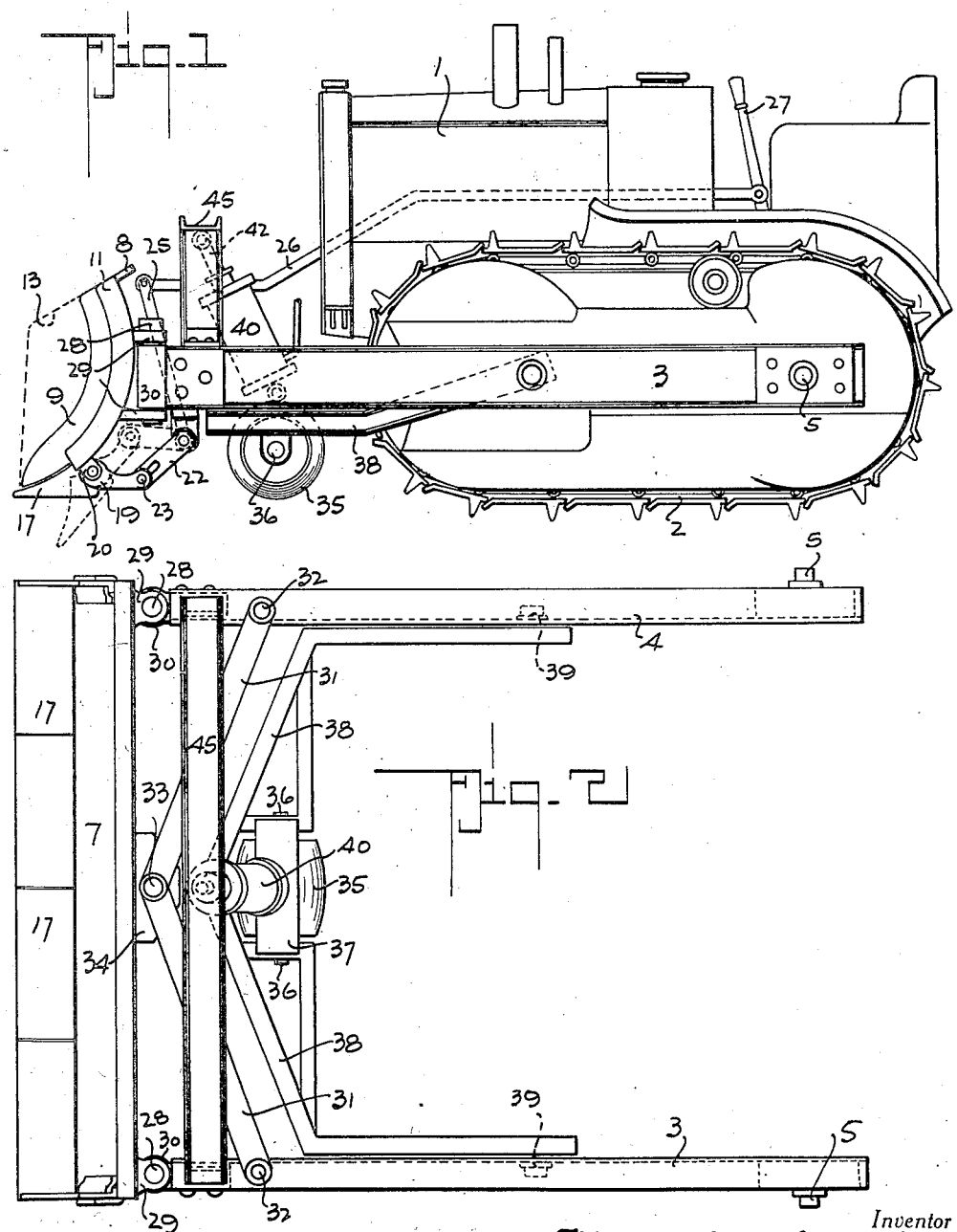

2,029,122

UNITED STATES PATENT OFFICE 2,029,122

GRADING MACHINE

Mark W. Stout, Jr., Wellpinit, Wash., assignor of forty one-hundredths to John C. Wynecoop, Wellpinit, Wash.

Application January 12, 1935, Serial No. 1,506

4 Claims. (Cl. 37—144)

My present invention relates to an improved grading machine or excavating machine of the "bulldozer" type, which while adapted for various kinds of excavations of the earth and soil and similar engineering works, is especially designed for grading, leveling, and transporting, as well as for excavating, in road building. In addition to its function of pushing the material, as earth and rocks, the implement is adapted to perform the functions of a carrier for transporting a load after the excavating operation, after which the load may be dumped and spread out on the ground surface for grading and leveling.

The implement of my invention is in the nature of an attachment mounted upon an automotive tractor preferably of the type employing a link-traction-belt or belts, and the parts are compactly combined and arranged in order that the implement may maneuver and operate in a restricted area, close to a bank, as well as out in the open. By the utilization of my invention in its combination and arrangement of parts I provide a strong, rugged, powerful and durable implement of this type having a heavy-duty capacity, and capable of performing its functions with facility and efficiency.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention, but it will be understood that changes and alterations may be made in the exemplified structure, within the scope of my claims, without departing from the principles of the invention.

Figure 1 is a view in side elevation of an implement embodying my invention.

Figure 2 is a plan view of the attachment of my invention detached from the tractor.

Figure 3 is an enlarged detail view at the right end of the excavating blade, showing the manner of attaching the side wings thereto, and Figure 4 is a similar view illustrating an extension that may be employed at the ends of the blade for increasing the load-capacity of the blade.

Figure 5 is an enlarged vertical sectional view at the front of the frame showing the drop-shoe mounted at the working edge of the blade, and also the motor operated device for elevating the attachment with relation to the tractor.

In order that the general assembly and relation of parts may readily be understood I have shown in Figure 1 a conventional tractor 1 having propulsion and operating mechanism, and preferably equipped with link traction belts indicated at 2.

The attachment which is combined with the automotive tractor includes a pair of side beams 3 and 4 of channel shape, located at opposite sides and exterior of the tractor, and the rear ends of these beams are pivoted at 5 near the rear end of the tractor and preferably on the rear axle, or an axial extension thereof.

The side beams project in front of the tractor, and the blade 7, which may be employed as a shovel, plow, scoop, or carrier, is mounted at the front ends of the beams of the frame. The blade, as best seen in Figure 5 is concavo-convex in shape, with its concavity at the front or working face thereof, and across the top of the blade a reinforcing rearwardly extending flange 8 is provided. At the opposite ends or lateral edges of the blade a pair of side wings 9, 9 are mounted, and as best seen in Figure 3 at each end of the blade a flanged rib 10 is fashioned and spaced inwardly from an outer flange 11, to form an L-shaped groove that is adapted to receive the rear edge of the wing, which wing is formed with a flange 12 to fill the groove. The flanged, rear edge of each wing is slipped into the grooves and the wings are retained by gravity and friction in their mounted positions at the ends of the blade. The wings may readily be replaced if necessary on account of wear, and the wings illustrated may be dispensed with and other wings, as indicated at 13 by dotted lines, may be, substituted in lieu thereof. The wings 13 it will be noted convert the shallow blade into a bucket or scoop to increase the load-capacity of the implement, and when the bucket type is used a load may be excavated and carried to its destination for dumping.

In Figure 4 I show a lateral extension 14, one of which may be employed at each end of the blade, and the wing 11a of the extension is spaced beyond the end of the blade to increase the effective working length of the blade. The extension is fashioned with a brace as 15, and a flange 16, to engage in the L-shaped groove of the blade, similar to the wing in Figure 3.

The lower, working edge of the blade is fashioned with a shoe, preferably made up of sections as 17 so that repairs and replacements may readily be made if and when necessary. As indicated in Figure 2 the shoe sections are alined across the front of the blade, and these sections are of substantial thickness and size, with flat bottom faces to slide readily over a ground surface. At the rear ends of their upper curved faces the sections are fashioned with recesses or grooves 18 into which the lower front edge of the blade projects and in which recess the edge is seated to present a smooth, continuous surface for the front or working face of the implement. Because of its curvature of the blade and the forward extension of the shoe, these parts are adapted for use as a receptacle or carrier for the load, especially when the blade is uplifted, and as illustrated in Figures 1 and 5, the blade and its shoe are adapted to level, smooth, and grade the surface of the ground as the material is pushed and spread in front of the blade.

When the blade and shoe are employed as a receptacle or carrier for a load of material, the load is dumped by dropping the shoe while the receptacle or carrier is elevated, the dumping position of the shoe being illustrated by dotted lines in Figure 1. For this purpose the shoe is provided with rearwardly extending arms 19 that are hinged at 20 on brackets 21 projected from the rear face of the blade. Slotted lever arms 22 are pivoted at 23 to these rigid arms of the shoe and these lever arms are fixed to turn with a shaft 24 extending transversely of the implement and journaled in bearing brackets attached at the under side of the beams 3 and 4. A crank arm 25 is attached to the crank shaft 24, and a link 26 which is pivotally connected to the crank arm extends rearwardly to an operating lever 27 that is readily accessible for manipulation by the driver of the tractor. By pulling on the lever (to the right in Figure 1) the shoes may be swung on their hinges 19 to dotted position in Figure 1 for dumping the load, and then as the implement advances the upright shoe sections co-act with the blade in pushing or spreading the material.

The blade is rigidly mounted at the front ends of the two side beams by the use of end bolts 28 that pass through ears 29 on the blade and coupling sleeves 30 on the ends of the beams 3 and 4, and the upright sleeves provide a wide bearing-support for rigidly holding the blade and for transmitting strains from the blade to the beams.

Lateral brace bars 31, 31 are also provided for the blade, especially for the central portion thereof, and these bars which are bolted at their outer ends at 32 to the beams, are also secured by a single bolt 33 to ears or flanges 34 rigid with the rear face of the blade. These diagonally extending braces or bars 31, 31, sustain the central part of the blade and impose strains from that portion of the blade to the side beams 3 and 4.

The blade and its supported frame may be elevated, or vertically adjusted with relation to the tractor and the ground surface, with the pivots or trunnions 5, 5, as a center of movement, the adjustments being made to adapt the blade to the desired gage or height for leveling and grading a surface, and the blade may be elevated to maximum height above the ground surface, when the implement is being transported, or is carrying a load for deposit.

For supporting the blade and its frame I employ a ground wheel 35, preferably of barrel shape, or elliptical shape as shown, but in some instances a swiveled wheel of the caster type may be employed. The barrel or elliptical, shaped wheel is especially adapted for lateral sliding movements when the tractor is turning, to facilitate turning of the implement when operating in soft ground or earth. The wheel is journaled at 36 in a yoke 37, which yoke is rigidly supported above a U-shaped wheel-frame 38 made up of channel irons, with the rear ends of the frame pivoted at 39, 39 to the side beams 3 and 4, and at the inner sides of these beams.

A fluid pressure motor of suitable type, and including a cylinder 40 is mounted on top of the yoke 37 with a pivot bolt 41, and the stem 42 of the piston 43 is pivoted or hinged at 44 at the underside of a cross bar 45, the parts being arranged in such manner that when motive fluid is admitted to the cylinder under the piston, power will be transmitted to the cross-bar 45 rigid with the frame bars 3 and 4 to swing the latter on their pivots 5, 5, and thus elevate the blade and its frame.

Motive fluid pressure from a suitable source, and under proper control is supplied to the motor, and by lifting the blade and frame, or swinging them on their pivots 5, 5, their weight is imposed on the ground wheel 35, which as shown in Figure 2 is located at the longitudinal center of the implement for this purpose. The barrel shape or elliptical formation of the wheel facilitates its gliding over the ground surface, laterally, when the tractor is turned, and the length of the wheel provides an adequate and substantial bearing surface for supporting the blade and its frame from the ground wheel.

The rugged shoe 17 provides a cutter at the leading edge of blade for penetrating the material to facilitate scooping up a load and to facilitate leveling and grading operations, and as before mentioned, when the shoe is turned on edge as shown by dotted lines in Figure 1, it adds to the pushing surface of the blade for spreading the material.

The side wings 9, in addition to increasing the capacity for loading the receptacle or carrier, also perform the functions of vertically arranged cutters for slicing off the face of a bank, and the wings are interchangeable to suit different conditions of work.

Having thus fully described my invention, what I claim as new and desire to secure by Letters Patent is:—

1. The combination with an automotive vehicle, of a frame pivotally supported thereon and comprising a pair of side beams, a rigid cross bar joining the free ends of said beams, and an excavating blade mounted at the front of the frame, of a ground wheel, a frame for the wheel pivotally supported in said side beams and including a yoke, a motive fluid cylinder pivoted on the yoke, a piston in the cylinder and a stem therefor, a pivotal connection between said stem and the cross bar, and means for supplying motive fluid to said cylinder.

2. In an excavating appliance, the combination with a blade, of a forwardly projecting shoe having a recess in its upper face in which the lower edge of the blade is seated, pivotal supports at the rear of the blade, pivotal arms rigid with the shoe and mounted in said supports, and means connected with said arms for adjusting the shoe with relation to the blade.

3. In an excavating appliance, the combination with a blade having at its ends outer upright flanges, and spaced inner ribs having flanges adapted to form L-shaped grooves, side wings for the blade, and flanges on said side wings adapted to slide and fit in said grooves.

4. The combination with an automotive vehicle, a U-shaped frame pivoted at its rear end to said vehicle, and a transversely arranged blade mounted on the frame in front of the vehicle, of a ground wheel for supporting the free end of the frame and blade, a motor device interposed between the ground wheel and a part of the frame for elevating the blade and free end of the frame, a forwardly projecting shoe at the bottom leading edge of the blade, co-acting means on the blade and shoe for pivotally supporting the latter, and means for adjusting the shoe.

MARK W. STOUT, Jr.